US012382295B2

(12) United States Patent
Boisset et al.

(10) Patent No.: US 12,382,295 B2
(45) Date of Patent: Aug. 5, 2025

(54) METHOD FOR ADJUSTING A PERIODICITY OF COMMUNICATION BETWEEN A WHEEL UNIT AND AN AUTHORIZED DEVICE

(71) Applicant: Continental Automotive GmbH, Hannover (DE)

(72) Inventors: Jean-Philippe Boisset, Toulouse (FR); Nicolas Guinart, Toulouse (FR); Davy Ribreau, Toulouse (FR)

(73) Assignee: CONTINENTAL AUTOMOTIVE TECHNOLOGIES GMBH, Hannover (DE)

( * ) Notice: Subject to any disclaimer, the term of this patent is extended or adjusted under 35 U.S.C. 154(b) by 650 days.

(21) Appl. No.: 17/438,165

(22) PCT Filed: Mar. 19, 2020

(86) PCT No.: PCT/EP2020/057690
§ 371 (c)(1),
(2) Date: Sep. 10, 2021

(87) PCT Pub. No.: WO2020/188058
PCT Pub. Date: Sep. 24, 2020

(65) Prior Publication Data
US 2022/0150709 A1   May 12, 2022

(30) Foreign Application Priority Data
Mar. 20, 2019   (FR) ...................................... 1902844

(51) Int. Cl.
*H04W 12/64*   (2021.01)
*B60C 23/04*   (2006.01)
(Continued)

(52) U.S. Cl.
CPC .......... *H04W 12/64* (2021.01); *B60C 23/0462* (2013.01); *B60C 23/0479* (2013.01); *G08C 17/02* (2013.01); *H04W 12/106* (2021.01)

(58) Field of Classification Search
CPC ... H04W 12/64; G08C 17/02; B60C 23/0479; B60C 23/0462
See application file for complete search history.

(56) References Cited

U.S. PATENT DOCUMENTS 6,328,218 B1   12/2001   Gaultier
8,676,273 B1 *   3/2014   Fujisaki ............... H04M 1/724
                                                       455/418

(Continued)

FOREIGN PATENT DOCUMENTS

CN   102582537 A   7/2012
CN   102655683 A   9/2012
(Continued)

OTHER PUBLICATIONS

Chinese Office Action with Search Report for Chinese Application No. 202080037315.7, dated Nov. 28, 2022 with translation, 24 pages.
(Continued)

*Primary Examiner* — Hee K Song
(74) *Attorney, Agent, or Firm* — Buchanan Ingersoll & Rooney PC

(57) ABSTRACT

A method for adjusting a periodicity of communication between a wheel unit and a remote monitoring and/or control device, a communication being carried out using ultra-high-frequency radio waves, the wheel unit sending with a predetermined first periodicity basic signaling messages indicating its presence to any communication device located in an environment of the wheel unit. The wheel unit, having previously stored a group of communication devices authorized to serve as monitoring devices therefor, checks (Continued)

whether the communication device having sent a response message belongs to the group, and, if this is the case, the wheel unit replaces the first periodicity with at least one shorter second periodicity resulting in a more intense two-way exchange for any signaling message subsequently sent from the wheel unit to the authorized device.

13 Claims, 4 Drawing Sheets

(51) Int. Cl.
*G08C 17/02* (2006.01)
*H04W 12/106* (2021.01)

(56) References Cited

U.S. PATENT DOCUMENTS

| | | | |
|---|---|---|---|
| 8,725,315 B2 | 5/2014 | Talty et al. | |
| 9,322,744 B2 | 4/2016 | Shima et al. | |
| 9,738,125 B1* | 8/2017 | Brickley | B60D 1/62 |
| 9,988,016 B1* | 6/2018 | Bianchi, III | H04W 12/06 |
| 10,093,139 B2 | 10/2018 | Taki | |
| 10,245,904 B1* | 4/2019 | Van Wiemeersch | H04W 12/106 |
| 10,377,190 B2 | 8/2019 | Wicher et al. | |
| 10,661,615 B2 | 5/2020 | Tomakidi | |
| 10,777,027 B2 | 9/2020 | Oda et al. | |
| 2002/0075145 A1 | 6/2002 | Hardman et al. | |
| 2011/0044185 A1 | 2/2011 | Perraud et al. | |
| 2011/0163120 A1 | 7/2011 | Read | |
| 2015/0015389 A1* | 1/2015 | Mcintyre | B60C 23/0408 340/447 |
| 2016/0033964 A1* | 2/2016 | Sato | G05D 1/0274 701/24 |
| 2016/0082772 A1* | 3/2016 | Biderman | B60K 7/00 301/6.5 |
| 2016/0325592 A1 | 11/2016 | Tomakidi | |
| 2017/0057461 A1* | 3/2017 | Gaskin | G08B 21/0269 |
| 2017/0190225 A1 | 7/2017 | Yu et al. | |
| 2018/0050571 A1* | 2/2018 | Usami | H04B 1/3822 |
| 2018/0262937 A1 | 9/2018 | Lee et al. | |
| 2020/0180561 A1* | 6/2020 | Lane | G06V 40/103 |
| 2021/0162821 A1 | 6/2021 | Huard et al. | |
| 2021/0402833 A1* | 12/2021 | Avalur Nagarajan | B60C 23/0498 |

FOREIGN PATENT DOCUMENTS

| | | | | |
|---|---|---|---|---|
| CN | 103582577 A | | 2/2014 | |
| CN | 105856983 A | | 8/2016 | |
| CN | 106464740 A | | 2/2017 | |
| CN | 107639041 A | | 1/2018 | |
| CN | 108790627 A | * | 11/2018 | |
| CN | 109414969 A | | 3/2019 | |
| FR | 3084310 A1 | | 1/2020 | |
| KR | 20070045843 A | * | 10/2005 | B60C 23/0474 |
| WO | 2005080099 A1 | | 9/2005 | |
| WO | 2013063061 A1 | | 5/2013 | |
| WO | WO-2015107203 A1 | * | 7/2015 | B60C 23/0471 |
| WO | 2016012627 A1 | | 1/2016 | |

OTHER PUBLICATIONS

Zhang W., "Research on Embedded Positioning System of Vehicle", Jul. 2010, 12 pages with translation, Automation in Manufacturing, No. 07.

International Search Report and Written Opinion for International Application No. PCT/EP2020/057690, dated May 12, 2020, with partial English translation, 8 pages.

International Search Report and Written Opinion for International Application No. PCT/EP2020/057690, dated May 12, 2020, 11 pages (French).

* cited by examiner

[Fig. 1]
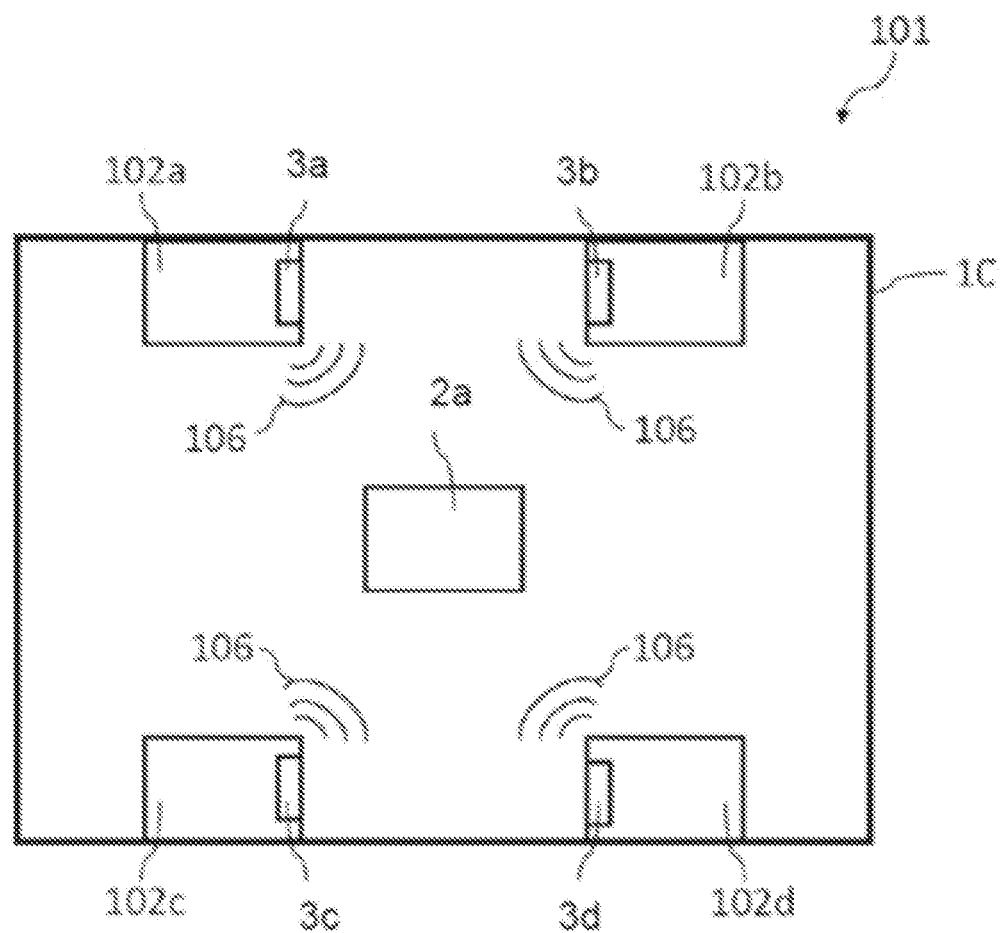

[Fig. 2]
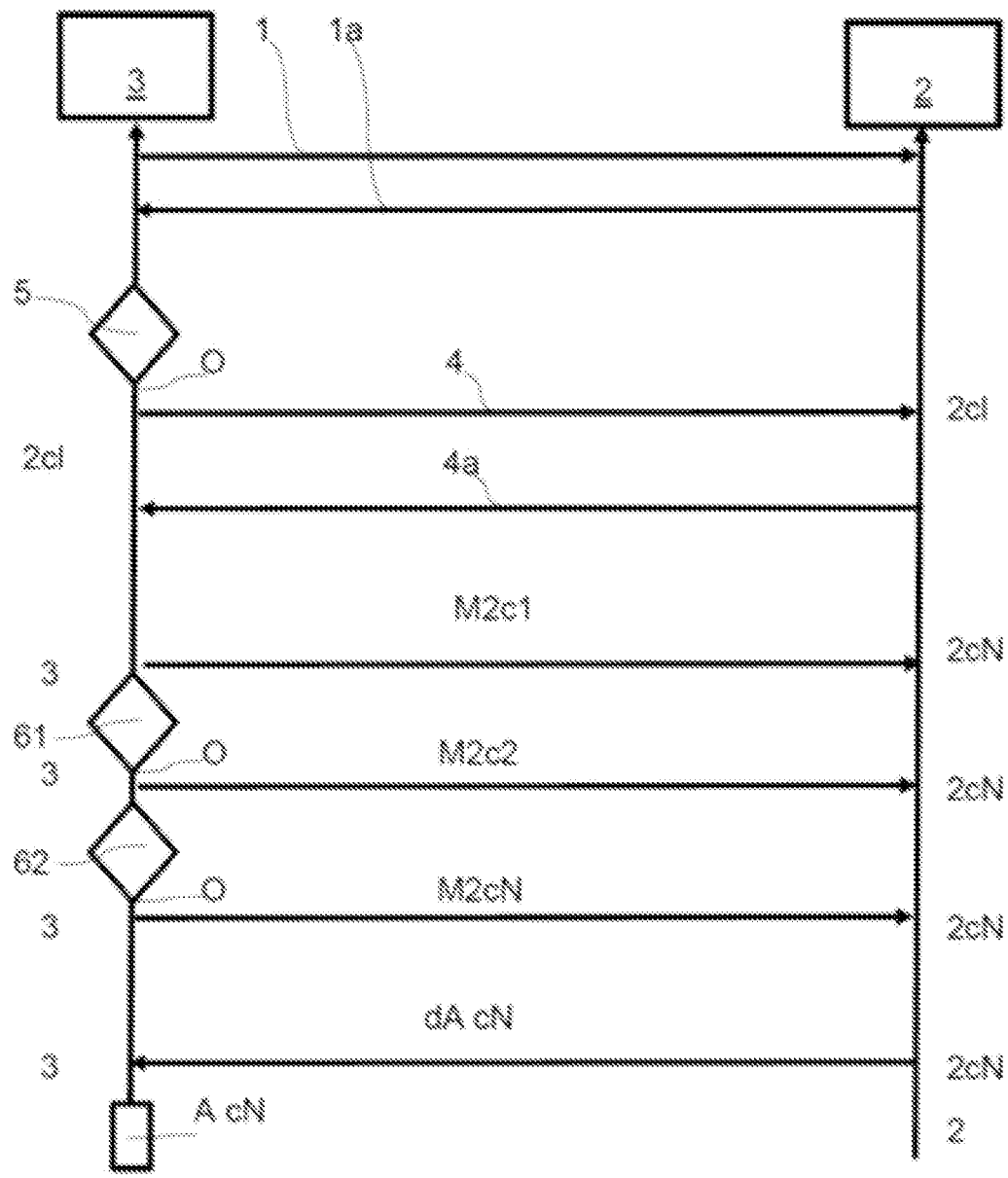

[Fig. 3]
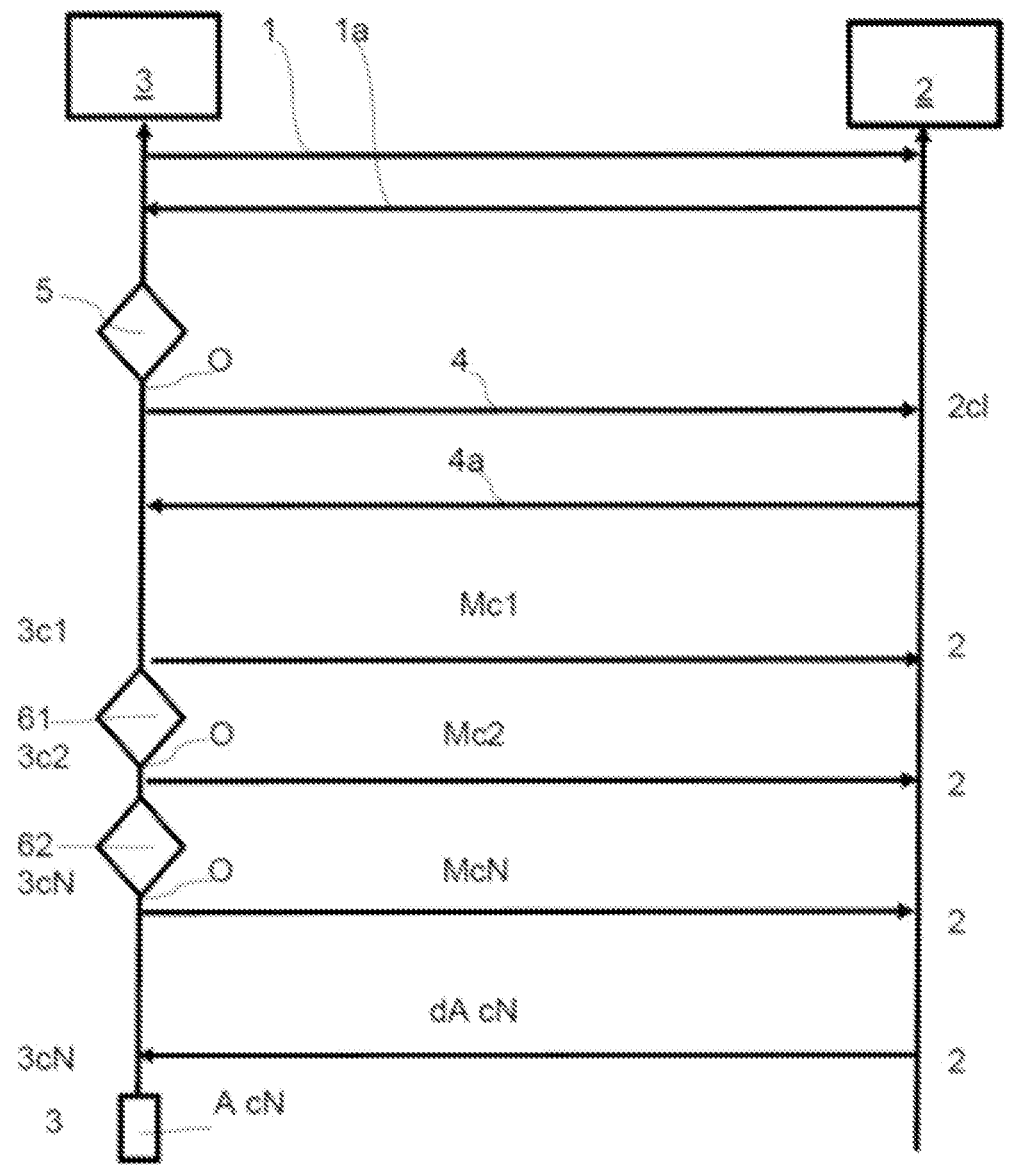

[Fig. 4]
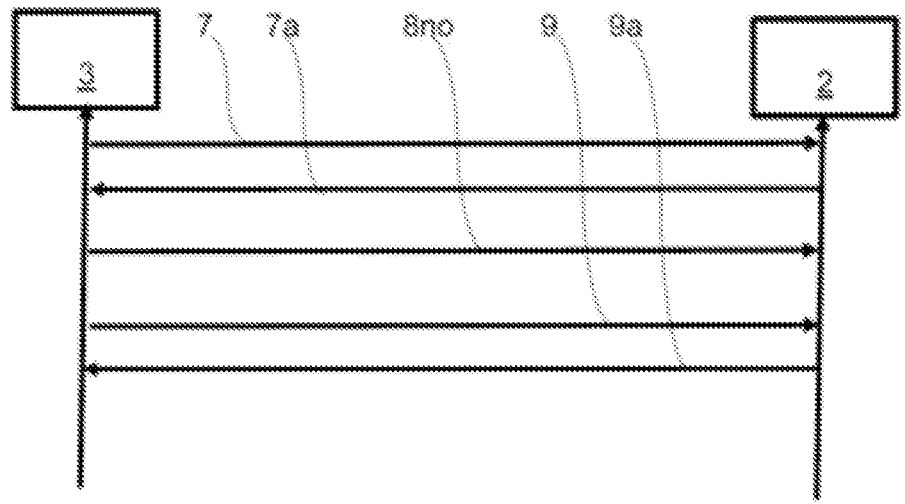
[Fig. 5]
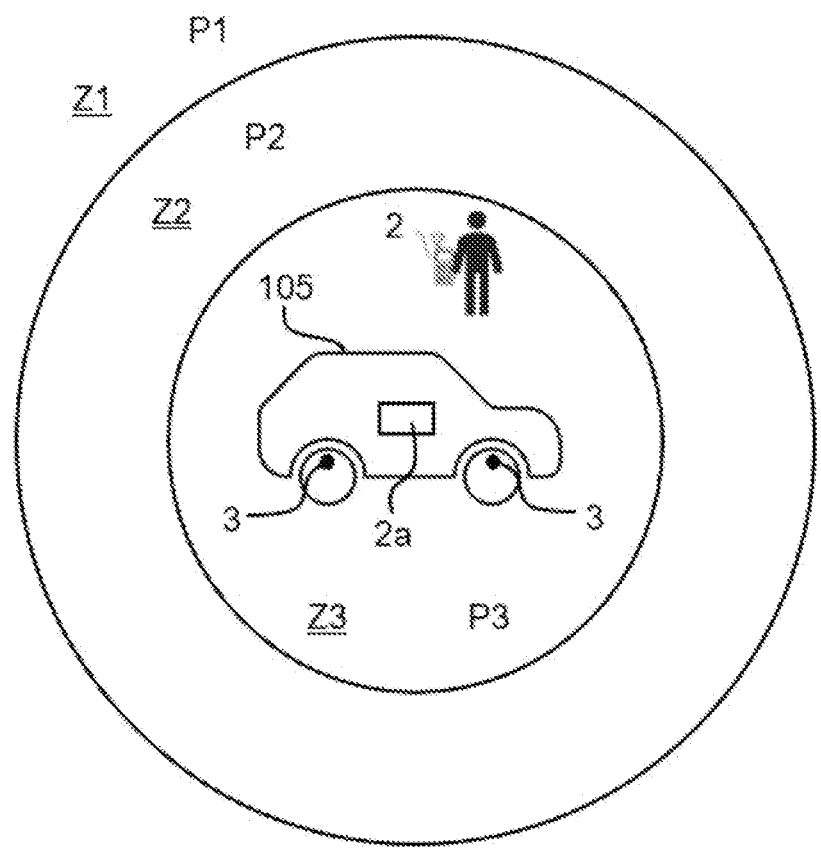

METHOD FOR ADJUSTING A PERIODICITY OF COMMUNICATION BETWEEN A WHEEL UNIT AND AN AUTHORIZED DEVICE

CROSS REFERENCE TO RELATED APPLICATIONS

This application is the U.S. National Phase Application of PCT International Application No. PCT/EP2020/057690, filed Mar. 19, 2020, which claims priority to French Patent Application No. 1902844, filed Mar. 20, 2019, the contents of such applications being incorporated by reference herein.

TECHNICAL FIELD OF THE INVENTION

The present invention relates to a method for adjusting a periodicity of communication between a wheel unit and a remote monitoring and/or control device.

The present invention also relates to a method for controlling, by way of a remote monitoring and/or control device, an activation of a command in a wheel unit associated with a wheel of a motor vehicle, this control method implementing such an adjusting method.

BACKGROUND OF THE INVENTION

Nowadays, in a motor vehicle, it is known practice to mount an electronic measurement module comprising one or more sensors in each wheel in order in particular to detect an anomaly with the wheel. These sensors may, for example, be a tire inflation pressure sensor for the tire associated with the wheel and/or a wheel acceleration sensor.

These sensors, and in particular inflation pressure sensors, are mounted in electronic modules, called "wheel units", of a tire pressure monitoring system, of the type known under the abbreviation "TPMS".

FIG. 1 shows a tire monitoring system 101 in a motor vehicle 105 equipped with wheel units 3a to 3d and with a central electronic unit 2a for controlling the wheel units 3a to 3d, which is placed at a distance from the wheel units 3a to 3d and, additionally, a mobile telephone in the possession of an authorized user serving as a device 2 for monitoring and/or controlling the wheel units 3a to 3d.

As is known, the wheel units 3a to 3d generally comprise a microprocessor, a memory, a transceiver, a supply battery, a pressure sensor and, if applicable, at least one other sensor such as a radial acceleration sensor capable of measuring the radial accelerations of the wheel or a temperature sensor, mounted on a support forming a printed circuit board or "PCB".

According to the prior art, each wheel unit 3a to 3d associated with a wheel 102a to 102d of the motor vehicle 105 sends its measurements to a central electronic unit 2a for controlling the wheel units 3a to 3d that is integrated in the motor vehicle 105 and/or a mobile telephone 2 or technical equivalent provided with an application for communicating with the wheel units 3a to 3d, the central electronic unit 2a and the mobile telephone 2 being grouped together below under the name of device for remotely monitoring and/or controlling the wheel units 3a to 3d.

To this end, each wheel unit 3a to 3d transmits signals 106 to one or more devices 2, 2a for remotely monitoring and/or controlling the wheel units 3a to 3d comprising coded messages containing the measurements or other information processed and/or supplied by the wheel units 3a to 3d.

As other information, mention may be made of information relating to the geometry of the wheel, in particular of the rim and/or of the tire or to the history of the wheel, in particular its mileage, of specific application data, in particular an identification of the wheel units 3a to 3d, a location of the wheel on the vehicle 105 and other configurations of the system.

Finally, the processed and/or supplied information may relate to configuration parameters of the software application, or even the executable code in the case of remote reprogramming of the wheel units 3a to 3d.

Communication between the monitoring device 2, 2a and the wheel unit 3a to 3d, whether it is a mobile telephone or technical equivalent in the possession of an authorized user or the central electronic unit 2a for controlling the wheel units 3a to 3d that is integrated into the motor vehicle 105, is carried out according to a communication protocol allowing a two-way short-range data exchange using ultra-high-frequency, or UHF, radio waves according to a communication protocol of Bluetooth® type or an equivalent protocol.

To do this, the wheel unit 3a to 3d periodically sends basic signaling messages indicating its presence to any ultra-high-frequency wave communication device 2 located in an environment of the wheel unit 3a to 3d.

Such a communication device 2 is capable of intercepting a basic signaling message and of sending a standard response message to the wheel unit 3a to 3d, in particular, but not necessarily, when it is authorized to do so.

In accordance with a Bluetooth™ protocol or with another similar protocol, the wheel unit sends a signaling message that includes the identifier of the authorized recipients. Thus, only these authorized recipients respond only to the signaling message. The wheel unit cannot be in an unwanted relationship with unauthorized devices unless it sends a message without a recipient, which could possibly be the case only when it is not yet assigned to a system.

There is another problem due to the fact that the periodicity with which the signaling messages are sent from the wheel unit is too high, this meaning that the communication between the wheel unit and the device is not very responsive.

This goes mainly for a detection of the arrival near the motor vehicle of a user bearing the authorized device, and for exchanges between a wheel unit and the authorized device with a view to selection of commands or the communication of data from the wheel unit to the authorized device.

In order to obtain a good responsiveness as regards authorized devices seeking to connect to the wheel unit, it is recommendable to shorten the period of transmission of signaling messages from the wheel unit.

The major drawback is therefore the very high level of power consumption implied by this shortening of the intervals at which signaling messages are sent from the wheel unit.

The authorized remote monitoring and/or control device may need to have a specific command performed by the one or more wheel units. Nonlimitingly, these commands activated by the device in a wheel unit may relate to the execution of particular functions, such as, for example, detection of aquaplaning, execution of particular diagnostics, particular sequences of transmissions with, in particular, modification of a periodicity with which messages are sent by the wheel unit and a determined functional scenario executed.

For example, it is common to check and, if necessary, update the location of the wheel units with respect to a wheel position in the vehicle. This check is generally performed at the start of a new driving cycle and requires, according to the current prior art, periodic transmissions of messages synchronized with a determined angular position of the transmitting wheel unit.

This synchronization requires specific processing by the wheel unit and significantly increases its level of energy consumption. In this case, the monitoring and/or control device activates and then deactivates the execution of this specific processing.

The problem underlying the present invention is that of optimizing communications between at least one wheel unit associated with a wheel of a motor vehicle and a monitoring and/or control device located at a distance from said at least one wheel unit, while limiting a power consumption of the wheel unit during the communications.

SUMMARY OF THE INVENTION

To this end, an aspect of the present invention relates to a method for adjusting a periodicity of communication between a wheel unit and a remote monitoring and/or control device, a communication between said monitoring device and the wheel unit being carried out according to a communication protocol allowing a two-way short-range exchange of data using ultra-high-frequency radio waves according to a communication protocol, for example of the Bluetooth® type, the wheel unit sending, with a predetermined first periodicity, basic signaling messages indicating its presence to any ultra-high-frequency wave communication device located in an environment of the wheel unit, a communication device being capable of intercepting a basic signaling message and of sending a standard response message to the wheel unit, noteworthy in that, the wheel unit, having previously stored a group of communication devices authorized to serve as remote monitoring and/or control devices therefor, checks whether the communication device having sent a standard response message belongs to the group, and, if this is the case, the wheel unit replaces the first periodicity with at least one shorter second periodicity resulting in a more intense two-way exchange for any signaling message subsequently sent from the wheel unit to the authorized device.

Strictly speaking, in a Bluetooth® protocol or equivalent, in response to a basic signaling message from the wheel unit, the control device cannot send data signifying a request to replace the first periodicity with at least one shorter second periodicity resulting in a more intense two-way exchange.

It can send only the equivalent of an acknowledgement of receipt of the basic signaling message sent by the wheel unit, without data included, which is called a standard response message.

It is this acknowledgement of receipt which acts as a request to replace the first periodicity with at least one shorter second periodicity when the wheel unit receives it, the wheel unit being programmed so that a standard response message sent by the device and received by the wheel unit, in response to a signaling message sent by the wheel unit, signifies such a replacement request.

Therefore, sending by means of the authorized device a standard response message forming only an acknowledgement of receipt in response to a signaling message sent by the wheel unit allows the wheel unit to know what action to take, in the present case a replacement of the first periodicity with at least one shorter second periodicity.

This is determined according to the signaling message that the wheel unit sent. It is therefore done without the authorized device needing to inform, in its response message, what action is to be taken by the wheel unit, which it would be unable to do.

An authorized device is an ultra-high-frequency, or UHF, communication device that has been recognized by the wheel unit as authorized to communicate with the wheel unit.

Thus, a period in which the wheel unit sends signaling messages becomes shorter when an authorized device is detected in proximity to the wheel unit and vice versa when the authorized device moves away from the motor vehicle. This allows the power consumption of the wheel unit, this wheel unit incorporating a button cell, i.e. a battery of limited capacity, to be moderated while ensuring it operates optimally with accelerated two-way exchange when the authorized UHF device is close to the wheel unit.

An aspect of the present invention provides a simple solution that makes it possible to solve the problems of consumption and availability of two-way communication, while maintaining the ability to control and trigger the functions of the wheel unit, and while decreasing the periodicity with which signaling messages are sent by the wheel unit to the authorized device.

The problems solved here are those of managing the service life of the wheel unit, the ability to maintain two-way exchanges despite an unfavorable communication environment, and the possibility of remotely controlling and triggering specific and contextual processes of the wheel unit.

To limit power consumption, the UHF communication module of a wheel unit may by default offer limited connection means in disconnected mode, and achieve this by transmitting signaling messages having, therebetween, a long periodicity, not allowing the quality of service expected by a user, i.e. the person in possession of the UHF communication device communicating with the wheel unit, to be obtained when this user is close to the vehicle and when the desired goal is not to detect the approach of the user but to set up an optimal communication between the wheel unit and the UHF communication device of the user.

Degrading, to save energy, the quality of the communication only makes sense when the motor vehicle has been stopped for a long time without a user, most often a driver, present.

When a user approaches the vehicle, the problem is different, the quality and speed of communication becoming paramount. The authorized device is capable of detecting the frames sent by a wheel unit at a relatively long distance.

On receipt of these frames, the authorized device, which is equipped with a suitable application, is able to automatically request additional data without having to make a connection request, and to do so in the message generated in response to the wheel unit having sent a signaling message, this response message being only a standard acknowledgement of receipt message. A downward change in the periodicity with which the messages are sent by the wheel unit favors the transmission of these data.

Advantageously, by implementing the method according to an aspect of the present invention, an authorized UHF communication device may remotely activate a specific command that is triggered by the wheel unit on detection of this request, because of the automatic decrease in the periodicity with which signaling messages are sent by the wheel unit when the authorized device has come sufficiently close to the wheel unit.

For example, when the wheel unit receives response messages from a UHF communication device that it identifies as authorized, the wheel unit may advantageously switch to a more intense communication mode, in order to facilitate a potential direct connection with the authorized device.

For example, transmissions of the signaling-message type from a wheel unit, which typically take place every 20 seconds for the sake of optimizing service life, may switch, on receipt of a response message from an authorized device, to a periodicity of 4 seconds or even less with, where appropriate, intermediate periodicities. Communication between the wheel unit and the authorized device is temporarily accelerated thereby.

As another example, still on detecting a recognized authorized UHF communication device, the fundamental activities of the wheel unit may be activated and/or accelerated in order to offer updated information expeditiously: pressure and/or temperature of the tire of the wheel, acceleration of the wheel, alerts, one-off event, etc.

Advantageously, for any standard response message received by the wheel unit and as regards implementation of said at least one second periodicity, at least two zones of reception of the basic signaling message of the wheel unit are defined, for the authorized device, depending on a proximity of the authorized device to the wheel unit, the second periodicity and at least one third periodicity shorter than the second periodicity being implemented for one of the reception zones that is closest to the wheel unit, said at least two reception zones being defined on the basis of respective ranges of the following values, considered individually or in combination: respective ranges of values of the power of the signal of the standard response message by the wheel unit, with a range of higher power values for the closest zone, or respective ranges of positional differences between position values obtained by a geolocation system integrated into the authorized device and a position value obtained by a geolocation system integrated into the motor vehicle, with a smaller range of differences for the closest zone.

This makes it possible to graduate the decrease in send periodicity as the authorized device gets closer to the wheel unit, with a view to finding the best possible compromise between, on the one hand, the decrease in power consumed by the wheel unit and, on the other hand, the quality and speed of the communication between the wheel unit and the authorized device.

Advantageously, a movement of the authorized device is detected in said at least two detection zones depending on the following values considered individually or in combination between two consecutive response messages sent by the authorized device: a difference in signal power values, a difference in positional differences, a difference in measurements of an accelerometer integrated into the authorized device or any equivalent means for detecting a movement of the authorized device, the periodicity then employed for the signaling messages sent from the wheel unit to the authorized device being decreased for a movement of the authorized device toward the wheel unit and increased for a movement of the authorized device away from the wheel unit.

Advantageously, a detected absence of movement of the authorized device results in an increase in the periodicity employed. This corresponds to a stationary user who therefore probably does not want to approach the motor vehicle.

Advantageously, in addition to checking that a communication device belongs to the group of receiving devices that are authorized to serve as remote monitoring and/or control devices for the wheel unit in the capacity of authorized devices, one or more of the following checks are carried out, considered individually or in combination:

sending, by the wheel unit exclusively to an authorized device, a check signaling message using an identifier of the communication device modified by adding a confirmation key known to the wheel unit and to any authorized device, an authorized device being programmed to temporarily modify its identifier by adding the confirmation key thereto, and, when the communication device receives the check signaling message with the confirmation key and responds with a standard check response message, it is confirmed that the communication device is indeed an authorized device wishing to trigger the replacement of the first periodicity with at least one second periodicity, sending, by the wheel unit exclusively to an authorized device, three successive signaling messages using an identifier of the communication device, the first message requesting a response, the second message containing a response interdiction and the third message requesting a response and, when the communication device responds to the first and third messages without responding to the second, it is confirmed that the communication device is indeed an authorized device wishing to trigger the replacement of the first periodicity with at least one second periodicity, sending, by the wheel unit exclusively to an authorized device, at least two signaling messages using an identifier of the communication device, the first signaling message being transmitted via a first, default frequency channel and said at least second signaling message being transmitted via a second channel, the frequency of which is different from the frequency of the first channel, an authorized device being programmed to perform, on receiving the first signaling message, a permutation of reception from the first channel to the second channel, and, when the communication device has performed such a permutation and responded to said at least two signaling messages with a standard response message, it is confirmed that the communication device is indeed an authorized device wishing to trigger the replacement of the first periodicity with at least one second periodicity.

The communication device always responds with a standard response message containing no data and it is only the acknowledgement of receipt that the standard response message represents that is important as regards the confirmation or verification that the communication device is indeed an authorized device.

An aspect of the present invention also relates to a method for controlling, by means of a remote monitoring and/or control device, an activation of a command in a wheel unit associated with a wheel of a motor vehicle, the wheel unit having stored a list of commands to be activated on request and said monitoring device having stored the same list, noteworthy in that it implements such a method for adjusting a periodicity of communication between the wheel unit and the authorized device, and, if the authorized device has sent a standard response message, the wheel unit sends, with said at least one second periodicity, to the authorized device, a series of command-related signaling messages, each signaling message in the series being associated with a single command and the series enumerating all the commands of the list, the commands being such that there is one command per message for all the signaling messages of the series, and, when the authorized device receives a message related to a specific command that the authorized device requests to be activated by the wheel unit, the authorized device sends back to the wheel unit a standard response message that is interpreted by the wheel unit as an order to activate the specific command.

Analogously to what was mentioned above, the standard response message of the authorized device sent by way of acknowledgement of receipt acts as a command-enumeration request or, later on, as a request to activate a specific command when the wheel unit receives it. It is the time of reception of the standard response message by the wheel unit following a signaling message sent beforehand that determines the subject of the request from the authorized device.

Specifically, the wheel unit is programmed so that a standard response message sent by the device and received by the wheel unit signifies a request to enumerate the command list or a request to activate a specific command, depending on the signaling message that the wheel unit sent beforehand.

Likewise, at the end of the method, the standard response message that the authorized device sends back to the wheel unit, and which is a simple acknowledgement of receipt, and therefore contains no specific data, is interpreted by the wheel unit, which is programmed accordingly, as an order for the wheel unit to activate one of the commands.

Instead of sending all of the data relating to a command to be performed by the wheel unit, the command is identified by its number by exchanging signaling messages relating, respectively, to a command between the wheel unit and the authorized device, which is simpler and saves energy in the wheel unit.

If one signaling message relating to a command number is not received, another signaling message relating to the same command number will be received later whereas a long frame of data relating to the command would be lost and its transmission would have to be started over from scratch.

The method may also be applicable for controlling changes of state of the wheel unit, a change in the configurations specific to the communication, execution of a specific function or of a sequence of operations programmed in advance.

For the sake of saving energy, it is the authorized device that selects the commands to be activated. A plurality of commands may be activated simultaneously.

Advantageously, a number is assigned to each command in the list of commands and in each authorized device, the signaling messages of the series each taking the respective number of the associated command with an identifier linked to the wheel unit or an identifier linked to the authorized device.

Advantageously, when the authorized device sends back to the wheel unit a standard response message interpreted by the wheel unit as an activation order for a command, the sending of signaling messages for the other commands is suspended and, when the signaling messages have been sent to the authorized device without response therefrom for the entire series of commands, the wheel unit sends a signaling message to the authorized device and if the authorized device responds and confirms, in its response message, its request to list the commands contained in the list, a new series of command-related signaling messages is sent by the wheel unit to the authorized device.

This allows the process of selecting a command to be started again when communication has been lacking. The response messages from the authorized device are always in the form of an acknowledgement of receipt without any other data transmitted.

Advantageously, the wheel unit and the authorized device respectively comprising a basic identifier used for the communication of messages other than command-related signaling messages, a first of the basic identifiers of the wheel unit or of the authorized device is temporarily modified for the command-related signaling messages, the second of the basic identifiers of the wheel unit or of the authorized device remaining unchanged, the wheel unit or the authorized device with the unchanged second identifier taking into account from a start of sending of the command-related signaling messages that the first identifier has been temporarily modified.

In these two alternative embodiments, either the wheel unit changes identifier or the authorized device changes identifier, the first case being preferred.

Advantageously:
  when the first modified identifier is that of the wheel unit, the basic identifier of the wheel unit is temporarily duplicated into as many modified identifiers as there are commands in the list, each temporarily modified identifier of the wheel unit comprising a number of a respective command of the list, the basic identifier of the authorized device being retained, the authorized device responding to the signaling message from the wheel unit under the modified identifier comprising the number of the command that the authorized device requests to have activated, or
  when the first modified identifier is that of the authorized device, the basic identifier of the authorized device is temporarily modified to include the number of the command that the authorized device requests to have activated, the basic identifier of the wheel unit being retained, the wheel unit sending signaling messages relating to the commands for authorized devices identified, respectively, by the basic identifier of the authorized device including a respective command number, the authorized device with the modified identifier temporarily including the number of the command that the authorized device requests to have activated being the only one of said authorized devices to be able to respond to the signaling message containing the command number to be activated, the other authorized devices with modified identifiers being virtual.

Advantageously, when the two-way short-range data exchange using ultra-high-frequency radio waves is performed with a number of respective frequency channels at least equal to the number of commands to be activated, each signaling message sent by the wheel unit and relating to a respective command passes through a specific channel, a channel number being assigned to each channel corresponding to the number of the command associated with the signaling message passing through this channel, the numbering of the channels according to the commands being known to the authorized device, the authorized device responding only to the signal message that has passed through the channel bearing the same number as the command that the authorized device requests to have activated by the wheel unit.

Advantageously, the control method is performed on each of the wheel units that are associated with a wheel of one and the same motor vehicle.

An aspect of the present invention also relates to a wheel unit comprising an application-specific integrated circuit with a microprocessor for controlling the unit, the integrated circuit being provided with a microprocessor and storage means, the wheel unit also comprising a module for ultra-high-frequency communication according to a two-way communication protocol, for example of Bluetooth® type, noteworthy in that the integrated circuit implements an adjusting or control method such as described above.

An aspect of the present invention finally relates to a communication device or a central monitoring and/or control device unit on board the motor vehicle comprising a chip able to implement the adjusting or control method as discussed above.

BRIEF DESCRIPTION OF THE FIGURES

Other features, objects and advantages of the present invention will be apparent from a perusal of the following detailed description and the attached drawings provided as non-limiting examples, in which:

FIG. 1 schematically shows a view of a tire monitoring system in a motor vehicle, the system comprising wheel units each associated with a wheel of the vehicle and a central monitoring and/or control unit integrated into the motor vehicle, the system being able to communicate remotely with an electronic device such as a mobile telephone via ultra-high-frequency, or UHF, waves, such a system being known from the prior art but being able to implement the method for adjusting a send periodicity according to an aspect of the present invention, FIG. 2 schematically shows a first embodiment according to the present invention of the method for adjusting a periodicity of communication between a wheel unit and a remote monitoring and/or control device, the monitoring and/or control device changing name so as to receive signaling messages, each being specific to a proposed command for activation, these signaling messages being sent by the wheel unit in order to designate a command to be activated in the wheel unit, FIG. 3 schematically shows a second embodiment according to the present invention of the method for adjusting a periodicity of communication between a wheel unit and a remote monitoring and/or control device, the wheel unit changing name so as to send signaling messages, each being specific to a proposed command for activation, these signaling messages being sent to the wheel monitoring and/or control device in order to have it designate a command to be activated in the wheel unit from among the commands sent, FIG. 4 schematically shows an optional mode of auxiliary checking of authorization of a communication device to converse with the wheel unit in a method according to an aspect of the invention, the checking consisting in sending, by the wheel unit exclusively to an authorized device, three successive signaling messages using an identifier of the communication device by alternating response requests for the first and third messages with a response interdiction for the second signaling message, FIG. 5 schematically shows division, as regards a location of a communication device, of a field of reception of the basic signaling message sent by a wheel unit, the reception field being divided into three zones, with, as regards presence of the communication device in a zone increasingly close to the wheel unit, a periodicity with which messages are sent by the wheel unit becoming lower and lower.

DETAILED DESCRIPTION OF THE INVENTION

FIG. 1 has already been described in the introductory part of the present patent application.

Referring firstly to FIGS. 1, 2, 3 and 5, an aspect of the present invention relates to a method for adjusting a periodicity of communication between a wheel unit 3 and a remote monitoring and/or control device 2. The implementation of this method takes place in disconnected mode with respect to the wheel unit 3. What is stated for one wheel unit 3 is valid for all of the wheel units of a motor vehicle which were previously denoted 3a to 3d in FIG. 1.

What is meant by connected mode is a mode of communication that involves recurring protocol data exchanges in order to ensure the continuity of the communication link. This allows a large amount of information to be exchanged.

What is meant by disconnected mode is a mode of communication that involves brief exchanges without protocol data and does not require the communication link to be permanently maintained. However, the amount of information exchanged is limited.

In FIGS. 2, 3 and 5, a wheel unit is denoted 3 to represent any wheel unit 3a to 3d of FIG. 1, and the remote monitoring and/or control device is denoted 2. These references will also be taken below as respective identifiers of the wheel unit 3 and of the device 2, which is not the case in reality, an identifier being more complicated than just one number.

The remote monitoring and/or control device 2 may be a mobile telephone, a tablet computer, a smart watch, or an equivalent electronic element that has downloaded an application allowing it to carry out a two-way exchange of information with the wheel units 3 that are each associated with a respective wheel of a motor vehicle.

In the context of an aspect of the present invention, as is moreover becoming increasingly widespread for communications involving one or more wheel units 3, a communication between the monitoring device 2 and the wheel unit 3 takes place according to a communication protocol allowing a two-way short-range data exchange using ultra-high-frequency radio waves, advantageously according to a communication protocol of Bluetooth® type.

For this purpose, the wheel unit 3 comprises a UHF module provided with a UHF transmitter and a UHF receiver, a microprocessor and storage means. The two-way exchanges may concern multiple UHF channels differing in UHF frequency. The most frequently used UHF communication may provide three channels, but there could be more. It has been possible to have up to 25 UHF channels for a single UHF module fitted to a wheel unit 3. For example, the signaling messages use three frequency channels. The rest of the channels are dedicated to connected mode.

The wheel unit 3 sends with a predetermined first periodicity P1 basic signaling messages 1 indicating its presence to any ultra-high-frequency wave communication device 2 located in an environment of the wheel unit 3.

This is a conventional Bluetooth® protocol communication mode and it does not make it possible to differentiate between the receiving communication devices that are authorized to receive information sent by the wheel unit 3 and those that are not.

The basic signaling messages 1 sent by the wheel unit 3 are simple, do not contain data, cannot be addressed, except in special cases, to a specific UHF communication device, and only serve to signal the presence of the wheel unit 3 to the device.

A UHF communication device is capable of intercepting a basic signaling message 1 and sending a standard response message 1a to the wheel unit 3. This standard response message does not contain data specific to a change in the periodicity with which the signaling messages are transmitted by the wheel unit but, rather, the fact alone that it is sent by the authorized device 2 and received by the wheel unit 3 is interpreted as a request to change periodicity by the wheel unit 3, which is programmed to interpret the standard response message in this way.

This occurs for a device communicatively associated with the wheel unit 3 as a monitoring and/or control device 2 but may be the case for a UHF communication device that has no relationship with the wheel unit. 3.

It is therefore necessary to prevent this UHF communication device from being recognized as a device working with the wheel unit 3, such a device being referred to as an authorized device 2 in being a device 2 for remote monitoring and/or control via UHF communication recognized as being able to dialog with the wheel unit 3.

To do this, the wheel unit 3 has previously stored a group of communication devices that are authorized to serve as remote monitoring and/or control devices therefor. As with all devices paired for UHF communications, it is possible to add or remove a communication device to or from the group.

In other words, an authorized device has its identifier featuring in a list of the wheel unit listing the identifiers of known devices authorized to converse with the wheel unit in question.

With reference more particularly to FIGS. 2, 3 and 5, the wheel unit 3 checks whether the communication device having sent a standard response message belongs to the group, this being done via the questioning 5 via the output O for Oscar. Otherwise, the input of the questioning 5 is returned to, this not being illustrated in FIGS. 2 and 3.

If the communication device having sent a standard response message belongs to the group, the wheel unit 3 replaces the first periodicity P1 with at least one shorter second periodicity P2 resulting in a more intense two-way exchange for any signaling message subsequently sent from the wheel unit 3 to the authorized device 2.

In FIG. 5, also with reference to FIGS. 2 and 3 as regards references absent from FIG. 5, three zones Z1, Z2, Z3 have been shown. In the zone Z1 furthest from the wheel unit 3, a UHF communication device 2 is not able to receive a basic signaling message, identified by the reference number 1 in FIGS. 2 and 3.

The other two zones Z2 and Z3 are closer to the motor vehicle 105 than the zone Z1, the zone Z3, which is optional, being the closest. It is possible to have a single zone Z2 instead of the zones Z2 and Z3. The communication device 2 is shown positioned in the zone Z3, but this is non-limiting, because its user may move all around the motor vehicle 105 and toward or away therefrom.

Initially, the wheel unit 3 sends basic signaling messages 1 with a periodicity P1 that is relatively high, it for example being between 10 and 30 seconds, and preferably about 20 seconds.

When the communication device 2 responds to the basic signaling message 1 sent by the wheel unit 3 with a standard response message 1a, the communication device is necessarily located in one of the zones Z2 and Z3. The wheel unit 3 then automatically replaces the first periodicity P1 with a second periodicity P2 shorter than the first periodicity P1, or even with a third periodicity P3 even shorter than the second periodicity P2, as will now be more precisely detailed.

For any response message received by the wheel unit 3, and as regards implementation of at least one second periodicity P2, it is possible to define at least two reception zones Z2, Z3, in the zone of interception, by a UHF communication device, ideally an authorized device 2, of basic signaling messages 1 sent by the wheel unit 3, depending on a proximity of the authorized device 2 of the wheel unit 3.

This makes it possible to implement the aforementioned second periodicity P2, but also at least one third periodicity P3 shorter than the second periodicity P2 for one Z3 of the reception zones Z2, Z3 that is closest to the wheel unit 3.

It is possible to divide the zone of reception of signaling messages 1 into more than two zones Z2, Z3, these zones advantageously being concentric, circular and centered on the transmitting wheel unit 3, but this is non-limiting and may vary from one wheel unit 3 to the next and on account of transmission difficulties and transmission interference.

The two or more reception zones Z2, Z3 may be defined on the basis of respective ranges of the following values considered individually or in combination.

There may be respective ranges of values, measured by the wheel unit 3, of the power of the signal of the standard response message 1a, with a range of higher power values for the nearest zone Z3. This may vary all around the wheel unit 3 but in practice a wheel unit 3 will receive a stronger power signal from an authorized device 2 closer to the wheel unit 3 than from an authorized device 2 positioned further away.

It is also possible to use respective ranges of positional differences between position values obtained by a geolocation system integrated in the authorized device 2 and a position value obtained by a geolocation system integrated into the motor vehicle. In this case, a range of the smallest differences will naturally correspond to the closest zone Z3.

A movement of the user bearing the authorized device 2 away or closer to the transmitting wheel unit 3 may also be taken into account. A movement of the authorized device 2 may be detected in the two or more detection zones Z2, Z3 depending on the following values, considered individually or in combination, between two consecutive response messages sent by the authorized device 2.

The first value may relate to a difference in power values of the signal between the two response messages. If the power of the signal of the standard response message 1a received by the wheel unit 3 drops during a movement of the authorized device 2, it is likely that the authorized device 2 is moving away from the wheel unit 3.

The second value may relate to a difference in positional differences. Obviously, the more the positional difference between the wheel unit 3 and the authorized device 2 increases, the further the authorized device 2 is from the wheel unit 3.

The third value may be a difference in measurements of an accelerometer integrated into the authorized device 2 or any equivalent means for detecting a movement of the authorized device 2.

Consequently, the periodicity then employed for the signaling messages sent by the wheel unit 3 to the authorized device 2 may be decreased for a movement of the authorized device 2 toward the wheel unit 3 and increased for a movement of the authorized device 2 away from the wheel unit 3.

In one particular case, a detected absence of movement of the authorized device 2 may result in an increase in the periodicity employed, for reasons of economy, assuming that the user no longer wants to approach the motor vehicle 105.

In addition to checking that a communication device belongs to the group of receiving devices that are authorized to serve as remote monitoring and/or control devices for the wheel unit in the capacity of authorized devices, one or more of the following auxiliary checks may be carried out, taken individually or in combination.

The first auxiliary check, illustrated in FIGS. 2 and 3, consists of the check signaling message 4 sent from the wheel unit 3 to the communication device 2, the authorization of which is to be checked, and the standard check response message 4a that the communication device 2 sends back to the wheel unit 3 thus confirming its authorization.

In fact, the standard check response message 4a is no different from the standard response message 1a previously sent by the authorized device. It is only the nature of the signaling message 1 or check message 4 and the time of their reception by the wheel unit 3 that make it possible to differentiate the response messages 1a and 4a.

The check signaling message 4 comprises the identifier 2 of the communication device modified with the addition of a confirmation key cl known to the wheel unit 3 and to any authorized device 2 by giving the modified identifier 2cl.

The authorized device 2 is preprogrammed to temporarily modify its identifier by adding the confirmation key thereto, i.e. by transforming its identifier 2 into 2cl as shown in FIGS. 2 and 3.

When the communication device has actually received the check signaling message 4 with the confirmation key, it is confirmed that the communication device is indeed an authorized device wishing to trigger the replacement of the first periodicity with at least one second periodicity, 2 having preprogrammed a temporary modification of its identifier with a command key, otherwise it could not have received the check signaling message 4 with the confirmation key.

The communication device 2 then implicitly informs the wheel unit 3 by sending its standard check response message 4a and takes back its usual starting identifier 2.

The second auxiliary check, shown in FIG. 4 with a communication device which will be checked to be authorized, consists in sending, by the wheel unit 3, exclusively to a UHF communication device 2, three successive signaling messages 7, 8no, 9 using an identifier of the communication device by the communication device 2 in its response message to the wheel unit 3, therefore signaling messages 7, 8no, 9 meant only for it.

The first message 7 incorporates a response request, the second message incorporates a response interdiction request and the third message 8 incorporates a response request. When the communication device 2 responds with standard response messages 7a, 9a to the first and third messages 7, 9 without responding to the second 8, it is confirmed that the communication device is indeed an authorized device wishing to trigger the replacement of the first periodicity with at least one second periodicity, 2. The standard response messages 7a, 9a are similar.

The third auxiliary check, not shown in the figures, provides for sending, by the wheel unit exclusively to an authorized device, at least two signaling messages using an identifier of the communication device.

The first signaling message is transmitted via a first, default frequency channel and said at least second signaling message is transmitted via a second channel, the frequency of which is different from the frequency of the first channel. There may be more than two signaling messages, all sent via different channels.

An authorized device is programmed to perform, on receiving the first signaling message, a permutation of reception from the first channel to the second channel, and, where applicable, so on for n channels and n signaling messages.

Thus, when the communication device has performed such a permutation and responded to said at least two signaling messages with a standard response message, it is confirmed that the communication device is indeed an authorized device wishing to trigger the replacement of the first periodicity with at least one second periodicity.

An aspect of the present invention also relates to a method for controlling, by way of a remote monitoring and/or control device 2, an activation of a command in a wheel unit 3 associated with a wheel of a motor vehicle, the wheel unit 3 having stored a list of commands to be activated on request and said control device 2 having stored the same list. A device is said to be authorized when it is recognized as being authorized to be able to converse with the wheel unit 3.

As a first example of a command, this command may be an estimate of a footprint of the wheel associated with the wheel unit 3 so as to determine a quotient of the footprint of the wheel on the ground on the basis of a periodic acceleration curve plotted as a function of the time, the quotient being the ratio of a duration of a decrease in acceleration to a period of the acceleration curve.

Other commands may relate to a detection of a particular phenomenon such as aquaplaning, an execution of a particular sequence of transmissions or an adjustment of a basic sequence of transmissions such as measurements of one or more specific parameters of the wheel that is associated with the wheel unit 3, such as a pressure of the tire of the associated wheel, such as measurements of one or more specific parameters of the wheel that is associated with the wheel unit 3 such as a pressure or a temperature of the tire of the associated wheel, a speed of rotation of the wheel and/or a location of the wheel unit 3 on the motor vehicle.

This control method implements a method for adjusting a periodicity of communication between the wheel unit and the authorized device such as described above, to accelerate communications between the authorized device 2 and the wheel unit 3.

There may be two basic types of signaling message sent by the wheel unit. The first type groups together classic basic signaling messages that only indicate the presence of the wheel unit. The second type groups together basic signaling messages that additionally indicate a menu proposal of possible commands.

By combining these two types of signaling message, there may be a first variant of sending, by the wheel unit, three successive messages of the first type followed by one message of the second type. If an authorized device wants to effect a command, it must wait for a message of the second, menu proposal type to reach it.

There may be a second variant which, after receiving, by the wheel unit, a standard basic response from the authorized device, provides for the wheel unit to send a message of the second type. The operation is then performed in two stages: the authorized device first triggers the command enumeration proposal and then responds favorably thereto by sending a standard response message.

With reference more particularly to FIGS. 2 and 3, the wheel unit 3 will have checked beforehand whether the communication device having sent a standard response message belongs to the group, this being done in the questioning 5.

If this is the case, this case being referenced O for Oscar, and the authorized device 2 has sent a standard response message 1a containing no specific data, this message being interpreted, solely because it was sent, by the wheel unit 3 to be a request to enumerate the commands contained in the list, the wheel unit 3 sends, with said at least one second periodicity P2 or the third periodicity P3, as shown in FIG. 2, or another xth periodicity with x higher than 3, to the authorized device 2, a series M2c1, M2c2, M2cN; Mc1, Mc2, McN of command-related signaling messages.

Each signaling message of the series M2c1, M2c2, M2cN; Mc1, Mc2, McN is associated with a single command and the series enumerates all the commands of the list, the commands being such that there is one command per message for all the signaling messages of the series M2c1, M2c2, M2cN; Mc1, Mc2, McN.

When the authorized device 2 receives a message related to a specific command that the authorized device 2 requests to be activated by the wheel unit 3, the authorized device 2 sends back to the wheel unit 3 a standard response message that is interpreted by the wheel unit, solely because it was sent, as a request dA cN to activate the specific command, even though this standard response message dA cN is no different from a simple acknowledgement of receipt and contains no command data. The wheel unit 3 activates A cN the specific command thus selected.

A signaling message of the series M2c1, M2c2, M2cN; Mc1, Mc2, McN relating to a specific command may be repeated for a predetermined duration for as long as no response from the authorized device 2 is received by the wheel unit 3. This is shown by the questioning 61, 62, which indicates, via the output O, that the predetermined time allocated to the selection of a specific command has been exceeded. There may be multiple messages relating to one and the same command that are sent successively and not just one as shown in FIGS. 2 and 3.

When the predetermined duration is exceeded, which is illustrated by the output O from questioning step 61, 62, the sending of the messages specific to this command is suspended. A signaling message of the series M2c1, M2c2, M2cN; Mc1, Mc2, McN relating to another command is then sent and is repeated, if necessary, this being performed successively for all of the commands of the list.

Alternatively, a whole series of different commands may be sent all together. In this case, a signaling message specific to just one command may be followed by a specific signaling message for each of the other commands of the series, therefore without consecutively repeating signaling messages relating to one and the same command.

When the authorized device 2 sends back to the wheel unit 3 a standard response message 1a interpreted by the wheel unit as an activation order message dA cN for a command, the sending of signaling messages for the other commands is suspended. The process of sending signaling messages that are associated with other commands no longer applies because the command the activation of which is desired has been recognized by the authorized device 2. This may however be different when there is the possibility of selecting multiple commands simultaneously.

When the signaling messages relating to the commands M2c1, M2c2, M2cN; Mc1, Mc2, McN have been sent to the authorized device 2 without response therefrom for the entire series of commands, the wheel unit 3 sends a signaling message to the authorized device 2 to find out whether or not its request to send an enumeration of the commands contained in the command list is still valid.

This was done previously by sending the basic signaling message 1, to which the authorized device 2 responded with the standard response message 1a.

If the authorized device 2 responds and confirms, in its standard response message similar to the standard response message 1a, its request to enumerate the commands contained in the list, a new series M2c1, M2c2, M2cN; Mc1, Mc2, McN of command-related signaling messages is sent by the wheel unit 3 to the authorized device 2.

A number may be assigned to each command in the list of commands and in each authorized device 2, the signaling messages of the series M2c1, M2c2, M2cN; Mc1, Mc2, McN each taking the respective number of the associated command with an identifier linked to the wheel unit 3 or an identifier linked to the authorized device 2.

In FIGS. 2 and 3, the identifier of the wheel unit is given as its reference 3, which is the common reference for the wheel units 3a to 3d in FIG. 1, and the identifier of the authorized device is given as its reference 2 in FIG. 2, but it is understood that a basic identifier is more complex than just one digit.

The wheel unit 3 and the authorized device 2 therefore have, respectively, a basic identifier used for the communication of messages other than command-related signaling messages.

In the two optional embodiments illustrated in FIGS. 2 and 3, respectively, a first of the basic identifiers of the wheel unit 3 or of the authorized device 2, in FIG. 2 the identifier of the authorized device 2 and in FIG. 3 the identifier of the wheel unit 3, is temporarily modified for the signaling messages relating to the commands M2c1, M2c2, M2cN; Mc1, Mc2, McN.

The wheel unit 3 and the authorized device 2 may take back their basic identifier before or after sending the standard message interpreted by the wheel unit 3 as an activation order message dA cN for the specific command.

In FIG. 2, the authorized device 2 takes back its basic identifier 2 after having sent the standard response message interpreted as an activation order dA cN for the specific command and in FIG. 3, the wheel unit 3 takes back its basic identifier after having received the standard response message and interpreted it as an activation order dA cN for the specific command.

Throughout the sending of the command-related messages, the second of the basic identifiers of the wheel unit 3 or of the authorized device 2 remains unchanged, in FIG. 2 the identifier of the wheel unit 3 and in FIG. 3 the identifier of the authorized device 2.

The wheel unit 3 or the authorized device 2 with the unchanged second identifier then takes into account from a start of sending of the command-related signaling messages M2c1, M2c2, M2cN; Mc1, Mcg, McN that the first identifier, that of the authorized device 2 in FIG. 2 and that of the wheel unit 3 in FIG. 3, has been temporarily modified.

As can be seen in FIG. 2, which shows a first optional mode of communication between the wheel unit 3 and the authorized device 2 for determining the command to be activated, when the modified first identifier is that of the authorized device 2, the basic identifier of the authorized device 2 is temporarily modified to include the number of the command that the authorized device 2 requests to have activated by giving the modified identifier 2cN. At the same time, the basic identifier of the wheel unit 3 is retained.

The wheel unit 3 sends signaling messages relating to the commands M2c1, M2c2, M2cN for authorized devices that are identified, respectively, by the basic identifier of the authorized device 2 including a respective command number.

For example, if the identifier of the authorized device 2 is changed to 2cN to activate the command N, signaling messages M2c1 and M2c2 are sent to virtual authorized devices, which are not referenced in FIG. 2 but which may have, by analogy with the modified identifier 2cN of the authorized device 2 for a command x, an identifier 2cx of an authorized device that does not exist.

In FIG. 2, the signaling messages M2c1 and M2c2 are sent, respectively, for the first and second commands and designate the commands other than the command to be activated, which is the command N.

The authorized device 2 with modified identifier 2cN provisionally including the number of the command N that the authorized device 2 requests to be activated is the only one of said devices able to respond to the signaling message containing the number N of the command to be activated, the other authorized devices with modified identifier being virtual and not existing.

As can be seen in FIG. 3, which shows a second optional mode of communication between the wheel unit 3 and the authorized device 2 for determining the command to be activated, when the modified first identifier is that of the wheel unit 3, the basic identifier of the wheel unit 3 is temporarily duplicated into as many modified identifiers 3c1, 3c2, 3cN as there are commands in the list.

Each temporarily modified identifier 3c1, 3c2, 3cN of the wheel unit 3 comprises, in addition to the identifier of the wheel unit 3, a number of a respective command of the list, for example c1, c2 and cN for the first, second and nth commands. The basic identifier of the authorized device 2 is then kept as 2 in FIG. 3.

The authorized device 2 responds, with a standard response message, to the signaling message from the wheel unit 3 under the modified identifier 3c1, 3c2, 3cN comprising the number of the command that the authorized device 2 requests to have activated, in FIG. 3 the command N with a standard activation message dA cN in response by way of simple acknowledgement of receipt but implicitly including the number of the command to be activated because in response to a signaling message specific to a command McN sent by the wheel unit 3. The command N is then activated in the wheel unit 3, which is denoted A cN.

A third optional mode of communication between the wheel unit and the authorized device for determining the command to be activated, which is not shown in the figures, may be implemented when the two-way short-range data exchange using ultra-high-frequency radio waves is performed with a number of respective frequency channels at least equal to the number of commands to be activated.

In this configuration, each signaling message sent by the wheel unit and relating to a respective command passes through a specific channel. A channel number is assigned to each channel corresponding to the number of the command associated with the signaling message passing through this channel.

The numbering of the channels according to the commands is also known to the authorized device. In this third optional mode, the authorized device responds, with a standard response message, only to the signal message that has passed through the channel bearing the same number as the command that the authorized device requests to have activated by the wheel unit.

The control method may be applied to one, some or all of the wheel units, since for some of the commands, a comparison may be made between parameters of the wheel units.

In the case of a request for a command to be activated by wheel units, where the command remains the same for all of the wheel units, in order to prevent the method from being repeated for each of the units, which requires an expenditure of energy in each wheel unit, there may be selected, at least temporarily, one wheel unit from among the wheel units to be a concentrator wheel unit carrying out communication between the wheel units and at least one remote monitoring and/or control device for the activation of at least one command in at least one of the wheel units.

In this case, the concentrator wheel unit sends at least one signaling frame to at least one of the other wheel units when activation of a command is requested in said at least one of the other wheel units with mention of the requested command to be activated.

It is possible for a wheel unit that assumes the role of concentrator wheel unit to play the temporary role of an authorized device with respect to the other wheel units of the system. In this variant, the concentrator wheel unit would not be limited to sending one signaling message but could intercept, one by one, the signaling messages from the other wheel units, substantially performing the role of a central electronic control unit on board the motor vehicle.

The method described above may be produced either in the application portion of software, or directly handled by the basic functionalities of an electronic chip, integrated, for example, into a wheel unit, and being able to be stored in ROM/flash-type memory.

This also applies to the ultra-high-frequency communication device and the central electronic unit on board the motor vehicle that communicates with the wheel units.

An aspect of the present invention therefore also relates to a wheel unit comprising an application-specific integrated circuit with a microprocessor for controlling the unit, provided with a microprocessor and storage means, the integrated circuit of the wheel unit implementing an adjusting or control method as described above.

The wheel unit also comprises a module for ultra-high-frequency communication according to a communication protocol, for example of Bluetooth® type, with an antenna for communicating, both in reception and in transmission, with communication devices according to a protocol, for example of Bluetooth® type, and electronic components that are integrated at least partially, or otherwise, into the integrated circuit. For example, the communication module may comprise a microprocessor, a crystal-controlled clock and storage means.

The invention claimed is:

1. A method for adjusting a periodicity of communication between a wheel unit and a remote monitoring and/or control device, a communication between said monitoring device and the wheel unit being carried out according to a communication protocol allowing a two-way short-range exchange of data using ultra-high-frequency radio waves, the wheel unit sending, with a predetermined first periodicity, basic signaling messages indicating its presence to any ultra-high-frequency wave communication device located in an environment of the wheel unit, the communication device i) being capable of intercepting a basic signaling message and ii) of sending a standard response message to the wheel unit, wherein the wheel unit having previously stored a group of communication devices authorized to serve as remote monitoring and/or control devices therefor:

i) checks whether the communication device having sent a standard response message belongs to the group, and, ii) if this is the case, the wheel unit replaces the first periodicity with at least one shorter second periodicity resulting in a more intense two-way exchange for any signaling message subsequently sent from the wheel unit to the authorized device, and wherein, for any standard response message received by the wheel unit and as regards implementation of said at least one second periodicity, at least two zones of reception of the basic signaling message of the wheel unit are defined, for the authorized device, depending on a proximity of the authorized device to the wheel unit, the second periodicity and at least one third periodicity shorter than the second periodicity being implemented for one of the reception zones that is closest to the wheel unit, said at least two reception zones being defined on the basis of respective ranges of the following values, considered individually or in combination: respective ranges of values of the power of the signal of the standard response message received by the wheel unit, with a range of higher power values for the closest zone, or respective ranges of positional differences between position values obtained by a geolocation system integrated into the authorized device and a position value obtained by a geolocation system integrated into the motor vehicle, with a smaller range of differences for the closest zone.

2. The adjusting method as claimed in claim 1, wherein a movement of the authorized device is detected in said at least two detection zones depending on the following values considered individually or in combination between two consecutive standard response messages sent by the authorized device: a difference in signal power values, a difference in positional differences, a difference in measurements of an accelerometer integrated into the authorized device or any equivalent means for detecting a movement of the authorized device, the periodicity then employed for the signaling messages sent from the wheel unit to the authorized device being decreased for a movement of the authorized device toward the wheel unit and increased for a movement of the authorized device away from the wheel unit.

3. The adjusting method as claimed in claim 2, wherein a detected absence of movement of the authorized device results in an increase in the periodicity employed.

4. A method for adjusting a periodicity of communication between a wheel unit and a remote monitoring and/or control device, a communication between said monitoring device and the wheel unit being carried out according to a communication protocol allowing a two-way short-range exchange of data using ultra-high-frequency radio waves, the wheel unit sending, with a predetermined first periodicity, basic signaling messages indicating its presence to any ultra-high-frequency wave communication device located in an environment of the wheel unit, the communication device i) being capable of intercepting a basic signaling message and ii) of sending a standard response message to the wheel unit, wherein the wheel unit having previously stored a group of communication devices authorized to serve as remote monitoring and/or control devices therefor:

i) checks whether the communication device having sent a standard response message belongs to the group, and, ii) if this is the case, the wheel unit replaces the first periodicity with at least one shorter second periodicity resulting in a more intense two-way exchange for any signaling message subsequently sent from the wheel unit to the authorized device, and wherein, in addition to checking that a communication device belongs to the group of receiving devices that are authorized to serve as remote monitoring and/or control devices for the wheel unit in the capacity of authorized devices, one or more of the following checks are carried out, taken individually or in combination:

sending, by the wheel unit exclusively to a communication device, a check signaling message using an identifier of the communication device modified by adding a confirmation key known to the wheel unit and to any authorized device, an authorized device being programmed to temporarily modify its identifier by adding the confirmation key thereto, and, when the communication device receives the check signaling message with the confirmation key and responds with a check response message, it is confirmed that the communication device is indeed an authorized device wishing to trigger the replacement of the first periodicity with at least one second periodicity, sending, by the wheel unit exclusively to a communication device, three successive signaling messages using an identifier of the communication device by the communication device in its response message to the wheel unit, the first message requesting a response, the second message containing a response interdiction and the third message requesting a response and, when the communication device responds to the first and third messages without responding to the second, it is confirmed that the communication device is indeed an authorized device wishing to trigger the replacement of the first periodicity with at least one second periodicity, sending, by the wheel unit exclusively to a communication device, at least two signaling messages using an identifier of the communication device, the first signaling message being transmitted via a first, default frequency channel and said at least second signaling message being transmitted via a second channel, the frequency of which is different from the frequency of the first channel, an authorized device being programmed to perform, on receiving the first signaling message, a permutation of reception from the first channel to the second channel, and, when the communication device has performed such a permutation and responded to said at least two signaling messages with a standard response message, it is confirmed that the communication device is indeed an authorized device wishing to trigger the replacement of the first periodicity with at least one second periodicity.

5. A method for controlling, by a remote monitoring and/or control device, an activation of a command in a wheel unit associated with a wheel of a motor vehicle, the wheel unit having stored a list of commands to be activated on request and said monitoring device having stored the same list, wherein it implements a method for adjusting a periodicity of communication between the wheel unit and an authorized device, and, if the authorized device has sent a standard response message, the wheel unit sends, with said at least one second periodicity, to the authorized device, a series of command-related signaling messages, each signaling message in the series being associated with a single command and the series enumerating all the commands of the list, the commands being such that there is one command per message for all the signaling messages of the series, and, when the authorized device receives a message related to a specific command that the authorized device requests to be activated by the wheel unit, the authorized device sends back to the wheel unit a standard response message that is interpreted by the wheel unit as an order to activate the specific command.

6. The control method as claimed in claim 5, wherein a number is assigned to each command in the list of commands and in the authorized device, the signaling messages of the series each taking the respective number of the associated command with an identifier linked to the wheel unit or an identifier linked to the authorized device.

7. The control method as claimed in claim 6, wherein, when the authorized device sends back to the wheel unit a standard response message interpreted by the wheel unit as an activation order for a command, the sending of signaling messages for the other commands is suspended and, when the signaling messages have been sent to the authorized device without response therefrom for the entire series of commands, the wheel unit sends a signaling message to the authorized device and if the authorized device responds and confirms, in its standard response message, its request to enumerate the commands contained in the list, a new series of command-related signaling messages is sent by the wheel unit to the authorized device.

8. The control method as claimed in claim 7, wherein the wheel unit and the authorized device respectively comprising a basic identifier used for the communication of messages other than command-related signaling messages, a first of the basic identifiers of the wheel unit or of the authorized device is temporarily modified for the command-related signaling messages, the second of the basic identifiers of the wheel unit or of the authorized device remaining unchanged, the wheel unit or the authorized device with the unchanged second identifier taking into account from a start of sending the command-related signaling messages that the first identifier has been temporarily modified.

9. The control method as claimed in claim 7, wherein, when the two-way short-range data exchange using ultra-high-frequency radio waves is performed with a number of respective frequency channels at least equal to the number of commands to be activated, each signaling message sent by the wheel unit and relating to a respective command passes through a specific channel, a channel number being assigned to each channel corresponding to the number of the command associated with the signaling message passing through this channel, the numbering of the channels according to the commands being known to the authorized device, the authorized device responding only to the signal message that has passed through the channel bearing the same number as the command that the authorized device requests to have activated by the wheel unit.

10. The control method as claimed in claim 8, wherein:
when the first modified identifier is that of the wheel unit, the basic identifier of the wheel unit is temporarily duplicated into as many modified identifiers as there are commands in the list, each temporarily modified identifier of the wheel unit comprising a number of a respective command of the list, the basic identifier of the authorized device being retained, the authorized device responding to the signaling message from the wheel unit under the modified identifier comprising the number of the command that the authorized device requests to have activated, or when the first modified identifier is that of the authorized device, the basic identifier of the authorized device is temporarily modified to include the number of the command that the authorized device requests to have activated, the basic identifier of the wheel unit being retained, the wheel unit sending signaling messages relating to the commands for authorized devices identified, respectively, by the basic identifier of the authorized device including a respective command number, the authorized device with the modified identifier temporarily including the number of the command that the authorized device requests to have activated being the only one of said authorized devices to be able to respond to the signaling message containing the command number to be activated, the other authorized devices with modified identifiers being virtual.

11. The control method as claimed in claim 8, wherein, when the two-way short-range data exchange using ultra-high-frequency radio waves is performed with a number of respective frequency channels at least equal to the number of commands to be activated, each signaling message sent by the wheel unit and relating to a respective command passes through a specific channel, a channel number being assigned to each channel corresponding to the number of the command associated with the signaling message passing through this channel, the numbering of the channels according to the commands being known to the authorized device, the authorized device responding only to the signal message that has passed through the channel bearing the same number as the command that the authorized device requests to have activated by the wheel unit.

12. A wheel unit comprising an application-specific integrated circuit for controlling the unit, the integrated circuit being provided with a microprocessor and storage means, the wheel unit also comprising a module for ultra-high-frequency communication according to a two-way communication protocol, wherein the integrated circuit implements an adjusting method as claimed in claim 1.

13. A wheel unit comprising an application-specific integrated circuit for controlling the unit, the integrated circuit being provided with a microprocessor and storage means, the wheel unit also comprising a module for ultra-high-frequency communication according to a two-way communication protocol, wherein the integrated circuit implements a control method as claimed in claim 5.

* * * * *